United States Patent
Haggquist

(10) Patent No.: US 8,945,287 B2
(45) Date of Patent: Feb. 3, 2015

(54) ACTIVE PARTICLE-ENHANCED MEMBRANE AND METHODS FOR MAKING AND USING THE SAME

(75) Inventor: Gregory W. Haggquist, Longmont, CO (US)

(73) Assignee: Cocona, Inc., Boulder, CO (US)

( * ) Notice: Subject to any disclaimer, the term of this patent is extended or adjusted under 35 U.S.C. 154(b) by 1036 days.

(21) Appl. No.: 11/801,647

(22) Filed: May 9, 2007

(65) Prior Publication Data

US 2007/0264203 A1     Nov. 15, 2007

Related U.S. Application Data

(60) Provisional application No. 60/799,426, filed on May 9, 2006.

(51) Int. Cl.
    *B01D 53/22*      (2006.01)
    *B01D 71/06*      (2006.01)
    *B01D 53/02*      (2006.01)

(52) U.S. Cl.
USPC .............. 96/4; 96/12; 96/154; 95/52; 95/141; 428/403; 428/407; 427/220

(58) Field of Classification Search
USPC ........ 95/45, 52, 90, 141, 900, 901, 902; 96/4, 96/7, 8, 10, 11, 12, 108, 153, 154; 210/640, 641; 428/403, 404, 407; 424/617, 618, 630, 641; 427/212, 215, 427/220, 221
See application file for complete search history.

(56) References Cited

U.S. PATENT DOCUMENTS

| | | | |
|---|---|---|---|
| 3,783,085 | A | 1/1974 | Pearson et al. |
| 3,817,211 | A | 6/1974 | Brown et al. |
| 3,865,758 | A | 2/1975 | Yoshida et al. |
| 4,004,324 | A | 1/1977 | Bridge et al. |
| 4,099,186 | A | 7/1978 | Edwards et al. |
| 4,175,055 | A | 11/1979 | Goller et al. |

(Continued)

FOREIGN PATENT DOCUMENTS

| | | |
|---|---|---|
| CN | 1658948 | 8/2005 |
| DE | 2251 071 | 4/1973 |

(Continued)

OTHER PUBLICATIONS

International Search Report (PCT, Oct. 29, 2007).

(Continued)

*Primary Examiner* — Jason M Greene
(74) *Attorney, Agent, or Firm* — Neugeboren O'Dowd PC

(57) ABSTRACT

The present disclosure relates to active particle-enhanced membrane and methods for making and using the same. In some embodiments, a breathable membrane includes a base material solution and active particles. The active particles incorporated in the membrane may improve or add various desirable properties to the membrane, such as for example, the moisture vapor transport capability, the odor adsorbance, the anti-static properties, or the stealth properties of the membrane. In some embodiments, the base material may exhibit water-proof properties when converted into non-solution state, and thereby result in a water-proof membrane. In some embodiments, the active particles may be protected from losing activity before, during, or after (or any combination thereof) the process of producing the membrane. The membrane may be applied to a substrate, or may be used independent of a substrate.

62 Claims, 5 Drawing Sheets

(56) References Cited

U.S. PATENT DOCUMENTS

| | | | |
|---|---|---|---|
| 4,201,822 A | 5/1980 | Cowsar | |
| 4,244,059 A | 1/1981 | Pflaumer | |
| 4,342,811 A | 8/1982 | Lopatin et al. | |
| 4,349,406 A | 9/1982 | Stalter et al. | |
| 4,350,655 A | 9/1982 | Hoge | |
| 4,388,370 A | 6/1983 | Ellis et al. | |
| 4,396,663 A | 8/1983 | Mitchell et al. | |
| 4,455,187 A | 6/1984 | Von Blucher et al. | |
| 4,457,345 A | 7/1984 | Von Blucher et al. | |
| 4,460,641 A | 7/1984 | Barer et al. | |
| 4,496,415 A | 1/1985 | Sprengling | |
| 4,510,193 A | 4/1985 | Blucher et al. | |
| 4,513,047 A | 4/1985 | Leach et al. | |
| 4,550,123 A | 10/1985 | Lopatin et al. | |
| 4,551,191 A | 11/1985 | Kock et al. | |
| 4,559,164 A | 12/1985 | Kostelnik et al. | |
| 4,610,905 A | 9/1986 | Von Blucher et al. | |
| 4,645,519 A | 2/1987 | Fraioli et al. | |
| 4,649,077 A | 3/1987 | Lauchenauer et al. | |
| 4,654,256 A | 3/1987 | Doree et al. | |
| 4,698,956 A | 10/1987 | Clarke et al. | |
| 4,732,805 A | 3/1988 | Maggs | |
| 4,774,133 A | 9/1988 | Doree et al. | |
| 4,898,633 A | 2/1990 | Doree et al. | |
| 4,913,942 A | 4/1990 | Jick | |
| 4,920,168 A | 4/1990 | Nohr et al. | |
| 4,925,732 A | 5/1990 | Driskill et al. | |
| 5,037,412 A | 8/1991 | Tanzer et al. | |
| 5,122,407 A | 6/1992 | Yeo et al. | |
| 5,126,061 A | 6/1992 | Michael | |
| 5,134,031 A | 7/1992 | Kagechi et al. | |
| 5,139,543 A | 8/1992 | Sowinski | |
| 5,161,686 A | 11/1992 | Weber et al. | |
| 5,169,632 A | 12/1992 | Duell et al. | |
| 5,249,676 A | 10/1993 | Ashcraft et al. | |
| 5,281,437 A | 1/1994 | Singh | |
| 5,300,192 A | 4/1994 | Hansen et al. | |
| 5,300,357 A | 4/1994 | Gardiner | |
| 5,304,419 A | 4/1994 | Shores et al. | |
| 5,308,896 A | 5/1994 | Hansen et al. | |
| 5,334,414 A | 8/1994 | Edie et al. | |
| 5,334,436 A | 8/1994 | Hobbs et al. | |
| 5,338,340 A | 8/1994 | Kasmark, Jr. et al. | |
| 5,342,333 A | 8/1994 | Tanzer et al. | |
| 5,352,480 A | 10/1994 | Hansen et al. | |
| 5,364,380 A | 11/1994 | Tanzer et al. | |
| 5,383,236 A | 1/1995 | Sesselmann | |
| 5,391,374 A | 2/1995 | Charbonneau et al. | |
| 5,401,505 A | 3/1995 | Duell et al. | |
| 5,424,388 A | 6/1995 | Chen et al. | |
| 5,432,000 A | 7/1995 | Young et al. | |
| 5,433,953 A | 7/1995 | Tsuei et al. | |
| 5,445,876 A | 8/1995 | Kyricos | |
| 5,447,977 A | 9/1995 | Hansen et al. | |
| 5,462,538 A | 10/1995 | Korpman | |
| 5,482,773 A | 1/1996 | Bair | |
| 5,498,478 A | 3/1996 | Hansen et al. | |
| 5,536,786 A | 7/1996 | Callahan, Jr. et al. | |
| 5,538,783 A | 7/1996 | Hansen et al. | |
| 5,539,930 A | 7/1996 | Sesselmann | |
| 5,571,618 A | 11/1996 | Hansen et al. | |
| 5,582,644 A | 12/1996 | Gaddis et al. | |
| 5,589,194 A | 12/1996 | Tsuei et al. | |
| 5,589,256 A | 12/1996 | Hansen et al. | |
| 5,591,146 A | 1/1997 | Hasse | |
| 5,591,379 A | 1/1997 | Shores | |
| 5,603,992 A | 2/1997 | Woodhall et al. | |
| 5,605,746 A | 2/1997 | Groeger et al. | |
| 5,609,727 A | 3/1997 | Hansen et al. | |
| 5,614,570 A | 3/1997 | Hansen et al. | |
| 5,650,030 A | 7/1997 | Kyricos | |
| 5,678,247 A | 10/1997 | Vickers | |
| 5,681,305 A | 10/1997 | Korpman | |
| 5,709,910 A | 1/1998 | Argyle et al. | |
| 5,714,445 A | 2/1998 | Trinh et al. | |
| 5,766,443 A | 6/1998 | Hillrichs et al. | |
| 5,783,303 A | 7/1998 | Tsuei et al. | |
| 5,790,987 A | 8/1998 | Sesselmann | |
| 5,804,298 A | 9/1998 | Moy et al. | |
| 5,804,625 A | 9/1998 | Temperante et al. | |
| 5,811,045 A | 9/1998 | Pike | |
| 5,863,305 A | 1/1999 | Beardsley et al. | |
| 5,885,681 A | 3/1999 | Korpman | |
| 5,891,221 A | 4/1999 | Rohrbach et al. | |
| 5,902,384 A | 5/1999 | Rohrbach et al. | |
| 5,919,846 A | 7/1999 | Batlaw et al. | |
| 5,925,241 A | 7/1999 | Aldridge et al. | |
| 5,945,211 A | 8/1999 | Yamaguchi et al. | |
| 5,951,534 A | 9/1999 | Cummings et al. | |
| 5,951,744 A | 9/1999 | Rohrbach et al. | |
| 6,007,590 A | 12/1999 | Sanders, Jr. | |
| 6,009,559 A | 1/2000 | Sesselmann | |
| 6,017,831 A | 1/2000 | Beardsley et al. | |
| 6,027,746 A | 2/2000 | Lech | |
| 6,028,019 A * | 2/2000 | Spijkers et al. | 442/395 |
| 6,043,168 A | 3/2000 | Colman et al. | |
| 6,057,072 A | 5/2000 | Guistina et al. | |
| 6,080,418 A | 6/2000 | Sengupta et al. | |
| 6,127,470 A | 10/2000 | Cobb, III et al. | |
| 6,134,718 A | 10/2000 | Sesselmann | |
| 6,207,255 B1 | 3/2001 | Fukuura et al. | |
| 6,267,575 B1 | 7/2001 | Rooyakkers et al. | |
| 6,294,183 B1 | 9/2001 | Ito et al. | |
| 6,350,492 B1 | 2/2002 | Gillick et al. | |
| 6,391,429 B1 | 5/2002 | Senkus et al. | |
| 6,426,025 B1 | 7/2002 | Goeman | |
| 6,451,427 B1 | 9/2002 | Takashima | |
| 6,468,651 B2 | 10/2002 | Aikawa et al. | |
| 6,475,340 B1 | 11/2002 | Carlson et al. | |
| 6,482,514 B1 | 11/2002 | Matsumoto et al. | |
| 6,541,554 B2 | 4/2003 | Morin et al. | |
| 6,565,875 B2 | 5/2003 | Tice et al. | |
| 6,569,527 B1 | 5/2003 | Calhoun et al. | |
| 6,641,842 B2 | 11/2003 | Laridon et al. | |
| 6,656,404 B2 | 12/2003 | Morin et al. | |
| 6,689,378 B1 | 2/2004 | Sun | |
| 6,692,823 B2 | 2/2004 | Kody et al. | |
| 6,702,797 B2 | 3/2004 | Williams | |
| 6,767,553 B2 | 7/2004 | Sun et al. | |
| 6,773,718 B2 | 8/2004 | Seth et al. | |
| 6,861,520 B1 | 3/2005 | Todd et al. | |
| 2001/0031938 A1 | 10/2001 | DeLucia et al. | |
| 2002/0037406 A1 | 3/2002 | Takashima | |
| 2002/0197396 A1 | 12/2002 | Haggquist | |
| 2003/0031694 A1 | 2/2003 | Anderson et al. | |
| 2003/0054141 A1 | 3/2003 | Worley et al. | |
| 2003/0060106 A1 * | 3/2003 | Haggquist et al. | 442/131 |
| 2003/0068353 A1 | 4/2003 | Chen et al. | |
| 2003/0088006 A1 | 5/2003 | Yanagisawa et al. | |
| 2003/0118664 A1 * | 6/2003 | Trogolo et al. | 424/618 |
| 2003/0195293 A1 | 10/2003 | Lubnin et al. | |
| 2004/0018359 A1 * | 1/2004 | Haggquist | 428/407 |
| 2004/0030022 A1 | 2/2004 | Brittain et al. | |
| 2004/0107474 A1 | 6/2004 | Sesselmann et al. | |
| 2005/0008776 A1 | 1/2005 | Chhabra et al. | |
| 2005/0075027 A1 | 4/2005 | Etchells et al. | |
| 2005/0076418 A1 * | 4/2005 | von Blucher | 2/161.6 |
| 2005/0143508 A1 * | 6/2005 | Tyagi et al. | 524/423 |
| 2006/0068124 A1 * | 3/2006 | Williams | 427/541 |
| 2009/0301493 A1 * | 12/2009 | McKenna et al. | 96/153 |

FOREIGN PATENT DOCUMENTS

| | | |
|---|---|---|
| DE | 4008 519 | 9/1990 |
| EP | 0 031 719 | 7/1981 |
| EP | 0 144 553 | 6/1985 |
| EP | 0 341 870 | 11/1989 |
| EP | 0 389 015 | 9/1990 |
| EP | 0 330 675 | 3/1992 |
| EP | 0 509 409 | 10/1992 |
| EP | 0 596 627 | 5/1994 |
| EP | 0 682 927 | 11/1995 |
| EP | 0 791 681 | 8/1997 |
| EP | 0 962 831 | 12/1999 |

(56) References Cited

FOREIGN PATENT DOCUMENTS

| | | |
|---|---|---|
| EP | 1 112 780 | 7/2001 |
| EP | 1 121 968 | 8/2001 |
| EP | 0 9743 724 | 10/2002 |
| EP | 0 959 852 | 5/2003 |
| EP | 1 198 280 | 6/2003 |
| EP | 1 115 469 | 10/2003 |
| EP | 1 135 087 | 1/2004 |
| EP | 1 403 035 | 3/2004 |
| FR | 1 287 139 | 3/1962 |
| GB | 2238802 | 6/1991 |
| GB | 2338720 | 12/1999 |
| JP | 59-032921 | 2/1984 |
| JP | 62-206083 | 9/1987 |
| JP | 63-100915 | 5/1988 |
| JP | 01-280073 | 11/1989 |
| JP | 01-299624 | 12/1989 |
| JP | 03-000057 | 1/1991 |
| JP | 09-075110 | 3/1997 |
| JP | 2000-093459 | 4/2000 |
| JP | 2000-160475 | 6/2000 |
| JP | 2001-046479 | 2/2001 |
| JP | 2003-340231 | 12/2003 |
| JP | 2004-003068 | 1/2004 |
| WO | WO 86/04367 | 7/1986 |
| WO | WO 89/12552 | 12/1989 |
| WO | WO 97/25955 | 7/1997 |
| WO | WO 98/07790 | 2/1998 |
| WO | WO 98/33644 | 8/1998 |
| WO | WO 98/42909 | 10/1998 |
| WO | WO 99/39675 | 8/1999 |
| WO | WO 00/47811 | 8/2000 |
| WO | WO 01/05583 | 1/2001 |
| WO | WO 01/18305 | 3/2001 |
| WO | WO 01/48025 | 7/2001 |
| WO | WO 02/083028 | 10/2002 |
| WO | WO 02/091977 | 11/2002 |
| WO | WO 03/000979 | 1/2003 |
| WO | WO 03/007714 | 1/2003 |
| WO | WO 03/027365 | 4/2003 |
| WO | 03106543 A1 | 12/2003 |
| WO | WO 03/105996 | 12/2003 |
| WO | WO 2004/024278 | 3/2004 |
| WO | WO 2005/017054 | 2/2005 |
| WO | WO 2007/133640 | 11/2007 |

OTHER PUBLICATIONS

"Filtertechnik vom Feinsten (The finest filter technology)"; AVR Allgemeiner Vliesstoff-Report, n 6, 2002, pp. 50-51. (Abstract only).
Huang et al., "A new filter media of nonwoven composite with activated carbon fibers"; Jounral of Advanced Materials, v 36 n 2, Apr. 2, 2004, pp. 35-38.
Kulkarni, V.G., "Color, functional and multi-attribute solutions for polyester fibers"; Chemical Fibers International, v 53, n 6, Dec. 23, 2003, pp. 452-454.
Le Leuch et al., "Removal of target odorous molecules on to activated carbon cloths"; Water Science and Technology, v 50, n 4, 2004, pp. 193-198.
Matsumoto et al., "Preparation and characterization of silica-modified activated carbon fibers"; Colloids and Surfaces A: Physicochemical and Engineering Aspects, v 74, n 1, Jul. 6, 1993, pp. 15-21.
McLeod et al., "Charcoal cloth in odour related adsorption"; Filtration and Separation, v 23, n 3, May-Jun. 1986, pp. 164-165.
"Micro-encapsulation: the sweet smell of success"; just-style.com Oct. 10, 2001. (Abstract only).

Myron J. Copland and George Lopatin, "Preparation of Activated Carbon-Filled Micro-porous Hollow Multifilament—A Summary Report," Report No. NATICK TR-78/036, National Technical Information Service, U.S. Department of Commerce, Nov. 1978.
Patent Abstracts of Japan, vol. 18, No. 571 of Japanese JP 06207376A, (Jul. 26, 1994).
Payne et al., "New durable antimicrobial finish for cotton textiles"; American Dyestuff Reporter, v 85, n. 6, Jun. 1996, pp. 26-30.
Robers, Felix F., "Intelligent textiles"; Textile Horizons, Jul./Aug. 2003, pp. 11-14.
Saito, Mitumasa, "Antibacterial, deodorizing, and UV absorbing materials obtained with zinc oxide (ZnO) coated fabrics"; Journal of Coated Fabrics, v 23, Oct. 1993, pp. 150-164.
International Search Report, Application No. PCT/US2003/18854, mailed Oct. 30, 2003.
International Search Report, Application No. PCT/US2007/024063, mailed Aug. 1, 2008.
Office Action Dated Oct. 3, 2008, U.S. Appl. No. 11/226,524.
SIPO, Notification of the Second Office Action re Chinese Application No. 200780024560.9, Aug. 24, 2011, p. 6, Published in: CN.
Percival, Shane, Response to the 2nd Chinese Office Action dated Aug. 8, 2011 sent to Foreign Associates, Oct. 13, 2011, p. 13, Published in: US.
Chifeng, Tu, "Office Action related to Chinese Application 2007-80024560.9", Dec. 31, 2010, p. 10, Published in: CN.
Percival, Shane, "Response to Dec. 31, 2010 Office Action," Jun. 28, 2010, pp. 1-10.
Chifeng, Tu, "Notification of the Third Office Action re application No. 2007-80024560.9", Jan. 29, 2012, p. 7, Published in: CN.
Kala, Naoto, "Japanese Office Action re application No. 2009-509860", Feb. 13, 2012, p. 8, Published in: JP.
Percival, Shane, "Letter to Chen Jizhuang with amendments and arguments for filing response to Jan. 29, 2012 Office Action re application No. 2007-80024560.9", May 16, 2012, p. 16, Published in US.
Percival, Shane, "Instructions sent to Shusaku Yamamoto in response to Feb. 15, 2012 Office Action re Japanese Application No. 2009-509860", Jun. 13, 2012, p. 18, Published in: US.
Chifeng, Tu, "Office Action re Chinese Patent Application No. 200780024560.9", Aug. 24, 2012, p. 8, Published in: CN.
Jizhuang, Chen, "Response to Office Action re Chinese Patent Application No. 2007-80024560.9", Jun. 13, 2012, p. 7, Published in: CN.
Percival, Shane, "Response to Office Action re Chinese Patent Application No. 2007-80024560.9", Dec. 18, 2012, p. 15, Published in: US.
Russell, Graham, "Communication of Extended Search Report in related European Patent Application No. 12178957.2 ", Sep. 27, 2012, p. 7, Published in: EP.
Yamamoto, Shusaku, "Response to Office Action re Japanese Application No. 2009-509860", Jun. 15, 2012, p. 25, Published in: JP.
Intellectual Property Office of Taiwan, "Office Action in related Taiwan Patent Application No. 096116533", Jun. 6, 2013, p. 26, Published in: TW.
Chen, Jizhaung, "Chinese Office Action re Application No. 200780024560.9", Apr. 28, 2013, p. 8, Published in: CN.
Percival, Shane, "Repsonse to Chinese Office Action re Application No. 200780024560.9", Jul. 9, 2013, p. 18, Published in: US.
Schutte, et al., "European Office Action re Application No. 07 794 738.0", Feb. 7, 2013, p. 5, Published in: EP.
Haggquist, Gregory W., "Declaration of Gregory W. Haggquist re Application No. 200780024560.9", Jul. 8, 2013, p. 8, Published in: US.
Yamazaki, Toshinao, "Japanese Office Action re Application No. 2009-509860", Jan. 10, 2013, p. 8, Published in: JP.
Percival, Shane, "Response to Japanese Office Action re Application No. 2009-509860", Jul. 10, 2013, p. 21, Published in: US.

* cited by examiner

| Sample | Polyurethane (g) | Carbon (g) | Surfynol 485 (g) | UP Cup MTVR (g/m$^2$/day) | Inverted Cup MTVR (g/m$^2$/day) |
| --- | --- | --- | --- | --- | --- |
| Control | 80 | 0 | 0 | 470 | 6356 |
| 1 | 80 | 20 | 10 | 621 | 6631 |
| 2 | 80 | 40 | 20 | 697 | 7155 |
| 3 | 80 | 80 | 40 | 699 | 6673 |
| 4 | 100 | 80 | 40 | 771 | 10185 |
| 5 | 100 | 80 | 40 | 1256 | 9337 |
| 6 | 100 | 80 | 40 | 1113 | 9925 |
| 7 | 100 | 80 | 40 | 1139 | 10385 |

FIG. 2

| Sample | Polyurethane (including additives) (g) | Carbon (g) | Surfynol 485 (g) | Substrate Side Volume Resistivity (ohms-cm) | Carbon Film Side Volume Resistivity (ohms-cm) |
|---|---|---|---|---|---|
| Control | 80 | 0 | 0 | 1.5 E10 | 4.00 E9 |
| 3 | 80 | 80 | 40 | 6.00 E6 | 1.85 E4 |
| 4 | 80 | 80 | 40 | 2.11 E9 | 2.19 E4 |
| 5 | 80 | 80 | 40 | 1.33 E10 | 1.87 E4 |
| 6 | 80 | 80 | 40 | 6.26 E9 | 1.22 E4 |
| 7 | 80 | 80 | 40 | 2.66 E9 | 2.31 E4 |
| Control 2 | 110 | 0 | 0 | 5.14 E13 | 6.38 E13 |
| 8 | 110 | 111 | 55.5 | 1.03 E11 | 6.26 E4 |
| 9 | 110 | 111 | 55.5 | 8.40 E10 | 4.83 E4 |
| 10 | 110 | 111 | 55.5 | 1.09 E10 | 4.69 E4 |

FIG. 3

| STYLE | SUBSTRATE SIDE VOLUME RESISTIVITY (OHMS-CM) | CARBON FILM SIDE VOLUME RESISTIVITY (OHMS-CM) |
|---|---|---|
| 41-6-3 | 6.00E6 | 1.85E4 |
| 41-6-5 | 1.50E10 | 4.00E9 |
| 41-6-7 | 2.11E9 | 2.19E4 |
| 41-6-8 | 1.33E10 | 1.87E4 |
| 41-6-9 | 6.26E9 | 1.22E4 |
| 41-6-10 | 2.66E9 | 2.31E4 |
| 41-7-1-2 | 1.03E11 | 6.26E4 |
| 41-7-2-1 | 8.40E10 | 4.83E4 |
| 41-7-3-1 | 1.09E10 | 4.69E4 |
| Base (control) | 5.14E13 | 6.38E13 |

FIG. 4

ACTIVE PARTICLE-ENHANCED MEMBRANE AND METHODS FOR MAKING AND USING THE SAME

CROSS-REFERENCE TO RELATED APPLICATION

This application claims the benefit under 35 U.S.C. §119 (e) of U.S. Provisional Application No. 60/799,426 filed May 9, 2006, which is hereby incorporated herein by reference in its entirety.

BACKGROUND OF THE DISCLOSURE

Materials may be used for their various properties. For example, materials, such as a polyurethane, polyacrylic, 1,3 propaneiol terephthalte (DuPont 3GT™ or DuPont Sorona™), and polyactide made from lactic acid (DOW Cargill Ingeo™) films, may be used for their water-proof and breathable properties. These materials provide moisture vapor transfer while preventing penetration of liquid. Such materials may be used, for example, in apparel (e.g., rain gear, jackets, gloves, boots, and pants). It is worth noting that a water-proof breathable membrane is different from a water-resistant breathable membrane. Under standard atmospheric pressure, a water-proof breathable membrane does not allow liquid to transverse the membrane, whereas a water-resistant membrane may permit traversal of liquid. A measurement known as hydrostatic head may be used to determine whether a membrane is waterproof or not. This measurement determines the pressure at which a membrane starts to leak water. A membrane is generally considered to be waterproof if it does not leak when subjected to a pressure of 1000 mbar.

Water-proof membranes may be advantageously used in materials to prevent or minimize moisture penetration into the material. Examples of such uses include use in garments, such as rain coats, where it is desirable to prevent the wearer of the garment from getting wet. Although water-proof membranes are superior to water-resistant membranes in their capacity to prevent or minimize moisture penetration, water-proof materials that are non-breathable exhibit limited capacity for moisture transport, when compared to water-resistant membranes. As a result, a garment made from water-proof non-breathable materials (e.g., rubber) may seem "hot and humid" to the wearer because it does not permit moisture vapor to escape from within the garment to the outside environment.

Therefore, there is a need for a breathable membrane (e.g., water-proof membrane) having improved moisture transport properties.

Yet another important property of materials relates to the material's anti-static capacity. Anti-static materials may be advantageously used in, for example, protective packaging materials to protect sensitive electronic components from static electrical charge. The problem with packaging electronic components and units so as to avoid the effects of electrostatic discharge has become increasingly acute as smaller and smaller dimensions are achieved in integrated circuits, making the devices more vulnerable to accidental discharge by relatively small voltage levels. There is therefore a need to produce anti-static materials with improved anti-static capabilities without losing other properties, such as flexibility and transparency, that are also desirable for the various uses of these materials.

Yet another often desirable property of materials is the stealth property of the material. Materials with stealth properties may be used to eliminate unwanted infra-red signatures during experiments. In military applications, stealth materials may be employed to enable aircrafts, soldiers, ships, and planes to operate while remaining less visible to radar, infra-red and other detection mechanisms. There is therefore a need to produce materials with improved stealth capabilities without losing other properties, such as flexibility and "hand and feel," that are also desirable for the various uses of these materials.

SUMMARY OF THE DISCLOSURE

The present disclosure relates to active particle-enhanced membrane and methods for making and using the same. The membrane can be a self-supporting membrane or a coating on a substrate. The present disclosure, while not limited as such, is particularly applicable to water-proof breathable membranes and methods of making and using the same. The present disclosure is also particularly applicable to quick-drying, odor-absorbing, anti-static membranes and methods for making and using the same, and to membranes with improved infra-red (IR) absorption and methods for making and using the same.

In some embodiments, a breathable membrane includes a base material solution and active particles. The active particles incorporated in the membrane may improve or add various desirable properties to the membrane, such as for example, moisture vapor transport capability, anti-static properties, or stealth properties. In some embodiments, the base material may exhibit water-proof properties when converted into non-solution state, and thereby result in a water-proof membrane. In some embodiments, the active particles may be protected from losing activity before, during, or after (or any combination thereof) the process of producing the membrane. In these embodiments, the active particles may be encapsulated in at least one removable encapsulant in an amount effective to prevent at least a substantial portion of the active particles from being deactivated prior to removal of the removable encapsulant. In some embodiments, the removable encapsulant may be removed to reactivate at least a portion of the active particles to improve the breathable, anti-static, or stealth properties of the membrane.

In some embodiments, the membrane may include polyurethane and solid particles. The membrane may be applied to a substrate such as a woven, non-woven, ePTFE (treated or untreated) substrate, PTFE substrate, polyurethane substrate, or knit material, or may be used independent of a substrate. In some embodiments, the membrane may be obtained from a mixture of a polyurethane solution, a polyacrylic solution, polyurethane solutions, 1,3 propanediol terephthalate solutions, or any other suitable solution, and protected or unprotected (or any combination thereof) active particles.

In some embodiments, after the encapsulated particles are incorporated into the base material solution, at least a portion of the removable protective substance (or removable encapsulant) may be removed to reactivate the active particles. Once the removable protective substance is removed, the active particles may bestow performance enhancing characteristics (e.g., odor adsorption, moisture management, etc.) to the base material solution or membrane. In addition to the performance enhancing characteristics that are imparted to the membrane, the active particles may be incorporated in a way that maintains the hand and feel, texture, durability, strength, stretchability, viscosity, compressibilty, expandability, relative density, other physical and chemical properties, or any combination thereof, generally associated with the base material before having the active particles incorporated therein.

Further features of the invention, its nature and various advantages, will be more apparent from the accompanying drawings and the following detailed description of the various embodiments.

BRIEF DESCRIPTION OF FIGURES

The objects and advantages of the invention will be apparent upon consideration of the following detailed description, taken in conjunction with the accompanying drawings, in which like reference characters refer to like parts throughout, and in which:

FIG. 2 shows specific formulations of mixtures that may be used to prepare active particle-enhanced membranes in accordance with the principles of some embodiments of the present invention;

FIG. 3 shows illustrative data obtained from an experiment the was performed in accordance with the principles of some embodiments of the present invention;

FIG. 4 shows illustrative data obtained from another experiment that was performed in accordance with the principles of some embodiments of the present invention.

DETAILED DESCRIPTION

Figure 1:
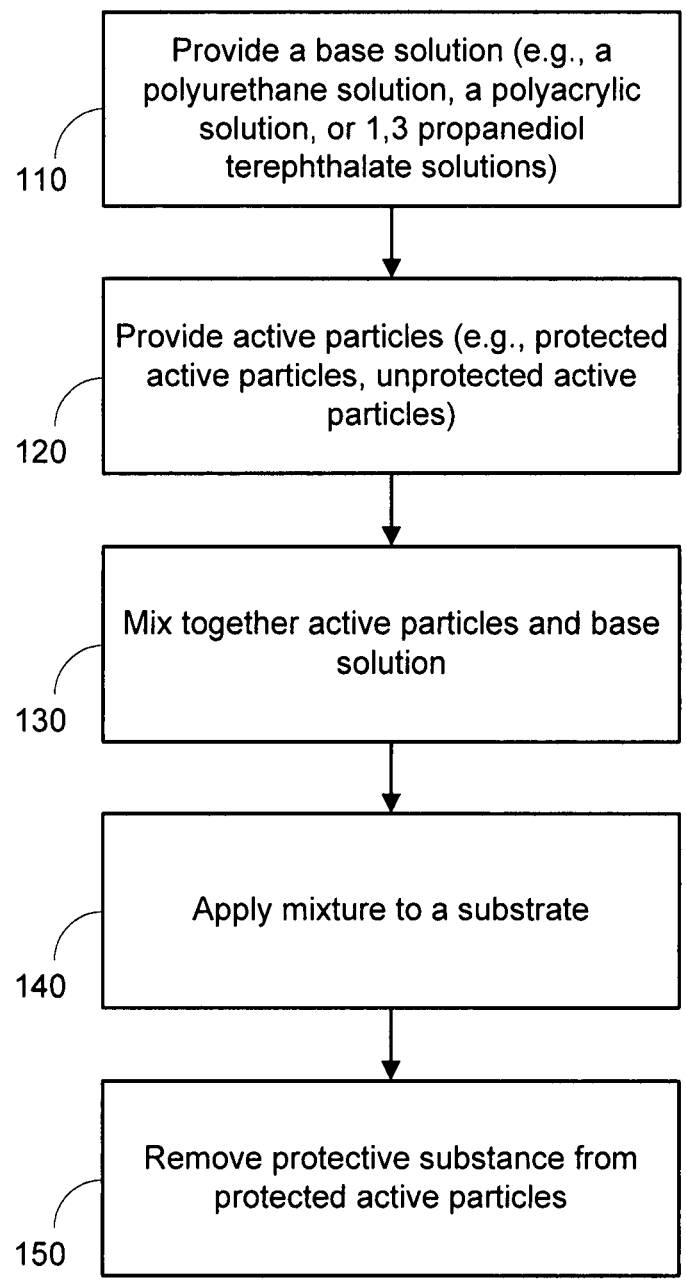
FIG. 1 shows a flowchart illustrating steps that may be taken to produce an active particle-enhanced membrane in accordance with the principles of some embodiments of the present invention.

FIG. 1 shows a flowchart illustrating steps that may be taken to produce active particle-enhanced membranes, such as, for example, a water-proof breathable membrane in accordance with the principles of some embodiments of the present invention. At step 110, a base material solution is provided. The base material solution may include a material, which when converted into a non-solution state (e.g., cured), exhibits water-proof breathable properties. For example, the base material solution may include a polyurethane solution, a polyacrylic solution, polyurethane solutions, 1,3 propanediol terephthalate solutions, or any other suitable solution. The base solution may include water and other ingredients such as cross-linking polymers. If desired, a combination of at least two different base material solutions may be used (e.g., a combination polyurethane and acrylic solution). An example of a polyurethane that may be used is a breathable polyurethane available from Noveon Corporation of Cleveland, Ohio. See, for example, U.S. Pat. No. 6,897,281, the disclosure of which is hereby incorporated by reference herein in its entirety, for a detailed discussion of a polyurethane that may be included in the base solution for a water-proof breathable membrane in accordance with the principles of some embodiments of the present invention.

In some embodiments, the base material solution may include Noveon's Permax™ polyurethane coating compound. In another embodiment, the base material solution may include Noveon's Permax™ polyurethane coating, an acrylic polymer, and an extra cross-linking agent.

At step 120, active particles may be provided. The active particles may be provided in a protected or unprotected state. It is well-known that certain particles may be used to add performance properties to materials in different forms such as gases, liquids, and solids. These particles may have properties that are suitable for odor adsorption, moisture management, ultraviolet light protection, chemical protection, bio-hazard protection, fire retardance, anti-bacterial protection, anti-viral protection, anti-fungal protection, anti-microbial protection, and other factors, and combinations thereof.

These particles may provide such properties because they are "active." That is, the surface of these particles may be active. Surface active particles are active because they have the capacity to cause chemical reactions at the surface or physical reactions, such as, adsorb or trap substances, including substances that may themselves be a solid, liquid, gas or any combination thereof. Examples of substances that may be trapped or adsorbed by active particles include, but are not limited to, pollen, water, butane, and ambient air. Certain types of active particles (such as activated carbon) have an adsorptive property because each particle has a large surface area made up of a multitude of pores (e.g., pores on the order of thousands, tens of thousands, or hundreds of thousands per particle). It is these pores that provide the particle or, more particularly, the surface of the particle with its activity (e.g., capacity to adsorb). For example, an active particle such as activated carbon may adsorb a substance (e.g., butane) by trapping the substance in the pores of the activated carbon.

Active particles may include, but are not limited to, activated carbon, aluminum oxide (activated alumina), silica gel, soda ash, aluminum trihydrate, baking soda, p-methoxy-2-ethoxyethyl ester Cinnamic acid (cinoxate), zinc oxide, zeolites, titanium dioxide, molecular filter type materials, and other suitable materials.

Exposing the active particles to a substance may reduce or permanently negate the activity of the active particles by blocking or inhibiting the pores, thus reducing the surface activity of the active particles. That is, once the pores are blocked or inhibited with a substance, those blocked or inhibited pores may be prevented from further adsorption. However, the adsorptive capacity of active particles may be increased or restored by removing the substance that is blocking or inhibiting the pores. Hence, active particles may be rejuvenated or reactivated, for example, by being heated to a predetermined temperature.

A common problem associated with active particles is that they may lose activity or become permanently deactivated before, during, or after a process that incorporates the particles into a material (e.g., a base material). For example, active particles may lose a portion of their activity when exposed to contaminants in the ambient environment prior to being used in a process or during shipment from the active particle manufacturer to the end-user. Regardless of how particle activity is negated or reduced, such negation or reduction thereof may adversely affect the product produced by the process using the active particle to add or improve one or more properties of the product. For example, if particle activity is reduced, heavier particle loading may be required to make up for the reduction in activity, potentially resulting in particle loadings that may negatively affect one or more of the desirable inherent characteristics (e.g., hand and feel) of the material treated in the process. Moreover, heavier particle loading may require increased binder loadings, which may further affect the inherent characteristics treated in the process. Thus, it will be understood that even the smallest diminution of particle activity may adversely affect the material because of the cumulative effects (e.g., additional particles and binder loadings) stemming from that reduction.

An active particle may be preserved with a removable encapsulant for protection against "premature deactivation" (i.e., deactivation at an undesirable, usually early, time) by a deleterious substance or by a non-deleterious substance, whether such premature deactivation would occur on account of introduction to a binder substance, introduction to an extrusion event, or otherwise. Upon removal of the encapsulant, the active particle is reactivated and the active particle becomes capable of performance adsorption in the environment (whether such performance adsorption results in a performance-induced deactivated state which is permanent through adsorption of a deleterious substance, or such performance adsorption results in a temporary performance-induced deactivated state through adsorption of a non-deleterious substance which may be removed through rejuvenation of the particle).

Active particles may be "protected" through use of at least one removable protective substance (or removable encapsulant). Introduction and removal of the protective substance results in enhanced active performance, such as for example, enhanced adsorption, moisture management, anti-microbial functionality, anti-fungal functionality, anti-bacterial, and catalytic interaction as compared to performance of the active particles if the protective substance had not been introduced. Protected active particles may enhance the effective performance of materials incorporating such active particles through use of the removable protective substance.

A more specific aspect of protected active particles is that the removable protective substance preserves the activity of active particles against premature deactivation. The premature deactivation may be caused by deleterious or non-deleterious substances or matter (such as deleterious adsorption of a base material during extrusion of a composition including the active particles and base material or a drawing of a film including the active particles and base material solution), such active particles having the ability to interact through particle surface exposure or particle surface proximity to various substances or matter (of any phase). Preservation from such premature deactivation is achieved through use of at least one removable protective substance (or removable encapsulant). The removable encapsulant or removable protective substance may maintain the active particles in a protected state to prevent premature deactivation, in a manner enabling removal of the protective substance during reactivation to permit subsequent active performance by the active particles. When an active particle is in a protected or deactivated state, its further performance interaction is temporarily or permanently reduced or negated altogether. If the deactivated state is the result of a deleterious event (such as for example, adsorption of a deleterious substance or matter), the further interaction at the affected areas of the particle is more permanent. Deleterious premature deactivation may occur in a variety of circumstances, including for example, when the active particle is introduced to a deleterious slurry or exposed to an extrusion process or other deleterious event or material at a time that will result in the inability of the particles to provide active performance at the desired time (such as for example, drawing a film of the material containing the particles). Deleterious deactivation may occur and not constitute premature deactivation, if such deactivation occurs at the desired or appropriate time (for example, after drawing of a film and in connection with an intended target substance or matter).

In the case of adsorptive activity and moisture management, when a removable protective substance is introduced to the active particle prior to exposure of the active particle to a deleterious event or other adsorptive performance limiter, the active particle is placed in a protected or deactivated state, limiting performance adsorption of the active particle for the time when premature deactivation is to be avoided. Reactivation by removal of the protective substance re-enables the active particles to interact with other substances or matter, such as for example, target substances or matter in the environment of a finished article incorporating the active particles.

When deactivation is the result of performance activity (in this case, performance adsorption) by the particles when incorporated in an article (adsorption at a time after removal of the removable protective substance), performance activity may be restored through rejuvenation (or other reactivation) if desired and if such deactivation was due to a non-deleterious event. A process of rejuvenation may include, for example, a washer/dryer cycling of a garment incorporating the waterproof breathable membrane of the invention.

With respect to the use of active particles to enhance performance activity in a base material (whether the activity is adsorptive, anti-microbial, dependent upon exposure of the surface of the particle to an environmental target of interaction, or simply an activity that is inhibited and/or enhanced through use of a removable protective substance), use of at least one removable encapsulant also enables use of fewer active particles in the embedding substance or matter (or in a resultant article) to achieve effective active performance, thereby reducing potential degradation of other physical properties (for example, strength or feel) of the embedding substance, matter or resultant article. Note that in this invention, it was suprisingly found that the addition of protected active particles to a base material solution, such as polyurethane solution, dramatically increased the breathability (or moisture vapor transport capacity) of the base material.

The use of a removable protective substance may also be designed to enable time-delayed exposure of a portion of active particles to effect an initial exposure or enhanced active performance at a later time (including for example, enhancement resulting from protection against premature deactivation).

Removable protective substances may include, but are not limited to, water-soluble surfactants, surfactants, salts (e.g., sodium chloride, calcium chloride), polymer salts, polyvinyl alcohols, waxes (e.g., paraffin, carnauba), photo-reactive materials, degradable materials, bio-degradable materials, ethoxylated acetylenic dials, starches, lubricants, glycols, mineral spirits, organic solvents, and any other suitable substances. Specific examples of such protective substances that are suitable for protecting active particles include the LPA-142 Solvent (paraffinic) sold by Sasol North America Inc. of Houston Tex., corn starch S9679 sold by Sigma-Aldrich of St. Louis Mo., the Surfynol AE03, AE02, 485W, 485, 2502, and 465 water soluble surfactants, sold by Air Products and Chemicals Corporation, of Allentown, Pa., waxes sold as Textile Wax-W and Size SF-2, by BASF Corporation, of Charlotte, N.C., and waxes sold as model numbers Kinco 878-S and Kinco 778-H by Kindt-Collins Company, of Cleveland, Ohio. Glycols sold by DOW Chemical Company under the name DOWANOL (DPnP, DPM, or DPMA) and TRITON CF-10 may also be used as a suitable protective substance.

A more detailed explanation of protected active particles, the preparation and applications thereof, and removal of the protective substance may be found, for example, in U.S. patent application publication no. 2004/0018359, which is incorporated herein by reference in its entirety. For the purposes of discussion of this invention, it is noted that active particles may be protected by mixing the active particles into a slurry of at least one protective substance, which may or may not be diluted with a solvent (e.g., water).

At step 130, the base material solution and the active particles may be mixed together. The active particles may be dispersed throughout the base material solution to provide a mixture having a uniform consistency. If desired, other ingredients, for example, a cross-linking agent or a solvent, may be added at this step. In some embodiments, the active particles may be protected by one or more encapsulants or protective substances prior to mixing with the base solution. In other embodiments, the active particles may be mixed with the base solution without encapsulation or protection. In yet other embodiments, only a portion of the active particles mixed with the base solution may be protected.

At step 140, the mixture may be applied to a substrate such that the mixture forms a layer or film thereon, prior to being cured or being converted by other suitable means into a non-solution form. The substrate may be a substance for which the cured mixture is intended to be permanently affixed such as, for example, a woven, a non-woven, paper or knitted material. In some embodiments, the mixture may be converted into non-solution state and used as a laminate. In approaches for which the cured mixture is intended to be removed and used independent of a substrate, the mixture may be applied to a release paper or other substance that has a low affinity for adhering to the cured mixture. The cured mixture may be referred to herein as a membrane. After coating the material the mixture is cured to provide a water-proof breathable membrane according to the principles of some embodiments of the invention. The mixture may be cured by subjecting it to a predetermined temperature for a predetermined period of time. Any conventional technique for effecting cure may be used such as, for example, a conventional oven, IR heating, or other suitable approach.

At step 150, if the active particles were protected before, during or after the process of producing the membrane, the protective substance may be removed from the active particles. The protective substance may be removed when the mixture is curing, or when subjected to a process (e.g., washing/drying cycle) or agent (e.g., light, solvent, bacteria) that causes the protective substance to be removed. It is understood that not all of the protective substance may be removed. That is, a portion of the protective substance may remain in contact with the base material or the active particles.

In practice, one or more steps shown in process 100 of FIG. 1 may be combined with other steps, performed in any suitable order, performed in parallel (e.g., simultaneously or substantially simultaneously) or removed.

It is further understood that the extent to which the protective substance is removed may vary with time. For example, the cured mixture may have to undergo several processes before all possible or nearly all possible protective substance may be removed. As another example, when two different protective substances are used, one substance may be removed relatively quickly as compared to the other.

The membrane obtained using the above-described process or variant thereof, surprisingly results in a material having liquid impermeable properties as well as enhanced moisture vapor transport properties.

It will be understood that the above-described process or variant thereof may also be used to produce a membrane that possesses other desirable properties derived, at least in part, from active particles incorporated therein. For example, in some embodiments, process 100 in FIG. 1 may be used to produce membranes with enhanced anti-static properties. In some embodiments, process 100 may be used to produce a membrane having improved stealth properties.

The membrane according to some embodiments of the invention may be derived from a mixture having different loadings of raw materials. The loading of each raw material (e.g., base material, activated carbon, and protective substance) may make up a predetermined percentage of the mixture. The loadings of materials may be in an amount effective for producing a membrane having desired properties.

The membrane, as derived from the mixture, may include a predetermined carbon weight percentage of the total weight of the membrane. For example, the carbon loading may range from about 0% to about 75% of the total weight of the membrane. In some embodiments, the carbon loading may range from about 0% to about 25%. In some embodiments, the carbon loading may range from about 0% to about 50%.

Certain carbon loadings may result in a membrane having better moisture vapor transport than other loadings, as well as better odor adsorption. For example, it was found that carbon loadings ranging from about 30% to about 50% of the total weight of the membrane significantly improved the moisture vapor transport capacity of the membrane while retaining the ability of the membrane to prevent moisture penetration penetration. It is understood that a predetermined carbon loading may be used to achieve one or more desired performance factors (e.g., moisture vapor transport and odor adsorption). It is also understood that the illustrative percentage weight loadings presented above are not restricted to activated carbon. These loading may be used for other active particles as well, and may be adjusted accordingly to account for the activity level to be derived from the active particles. Furthermore, the percentage loadings presented above are merely illustrative and do not exclude loadings that are not explicitly included within the named ranges. For example, percentage loadings outside of the ranges specified above are anticipated and within the spirit and principles of the present invention if such loadings allow the incorporated active particles to impart desirable properties onto the membrane while still retaining at least some of the properties of the membrane desired for various intended uses.

In some embodiments, a membrane may be created from a mixture in which the active particles are not protected. That is, a base material solution may be mixed with active particles and cured, resulting in a membrane having, for example, water-proof breathable properties. In some embodiments, a membrane may be created from a mixture including a base material solution and a removable protective substance, but not active particles. In some embodiments, a membrane may be created from a mixture including a base solution and non-active particles. In some embodiments, a membrane may be created from a mixture including a base solution, non-active particles, and a removable protective substance.

The following provides illustrative examples in which membranes are obtained from different mixtures. These examples are for the purposes of illustration only and are not to be construed as limiting the scope of the invention in any way.

EXAMPLE 1

Polyurethane solutions were combined with protected activated carbon. The protected activated carbon was suspended in the polyurethane solution and the mixture was applied to a nylon woven fabric. The mixture was dried and cured in an oven, where at least a portion of the protective substance was removed (e.g., evaporated off), resulting in a membrane coated on a substrate, the membrane having a thickness of one mil. The resultant membranes were then tested for butane adsorbance, dry time, moisture vapor transmission rate (MVTR), hydrostatic head, IR reflectance, and volume resistivity.

The moisture vapor transmission rate (MVTR) is the rate at which moisture permeates a dressing, film, membrane, or other construction, generally measured in grams per square meter per day (g/m²/day). Different methods for measuring MVTR include the Mocan method, the upright method for low moisture contact (indirect liquid contact with the membrane), and the inverted method for high moisture contact (direct liquid contact with the membrane). The upright method and the inverted method were used in this example.

MVTR by cup method may be measured according to Water method of ASTM E96-94 at 40 degrees Centigrade and 20% relative humidity over a 24 hour period. The cups typically have a 25 cm² area opening. For the upright cup test, approximately 10 g of purified water is placed in the cup, while for the inverted cup, 20 g of purified water is used. The water used is typically ultrapure and deionized.

Membranes were also produced by drawing down the mixture on release paper. These membranes were cured and dried in an oven and then removed from the release paper yielding a self supporting membrane. This membrane was one mil thick.

The activated carbon was protected with Surfynol 485™. The activated carbon was subjected to an aqueous slurry including water and Surfynol 485™. This slurry was added to the polyurethane solution, the viscosity of the slurry or mixture of polyurethane and protected carbon was adjusted by adding more water. The carbon was Asbury 5564™ powdered coconut activated carbon. A cross-linking agent was used to increase the molecular weight of the polyurethane, thereby better enabling the membrane to adhere to the substrate.

The mixtures were cast using a 1 mil draw down rod. Curing and drying was done in an oven at 350° F. for 30 minutes. Membranes were prepared from mixtures shown in FIG. 2. FIG. 2 shows specific illustrative formulations of mixtures used to prepare membranes in this example. Sample 41-6-5 is a control, as is the sample labeled "base." The nomenclature of samples beginning with 41-7 is now discussed. The number on the far right (e.g., "2" in sample 41-7-1-2) refers to a location in the membrane of the 41-7-1 sample. Thus, if the sample number is 41-7-1-4 (as shown in FIG. 3), data is obtained from location 4 in sample 41-7-1.

Each of the membranes were observed to be waterproof and breathable. FIG. 3 shows illustrative data obtained from membranes configured according to this example. This data includes the total weight, film weight, and carbon weight of each membrane sample. FIG. 3 also shows illustrative MVTR data obtained from the membrane samples. As indicated in FIG. 3, most of the samples have improved MVTR over the control.

In some embodiments, the methods described above for incorporating active particles into base materials (whether the active particles are protected prior to the incorporation or not) may be used to also produce membranes with enhanced anti-static and conductive properties. Anti-static materials are generally used for their ability to reduce or eliminate the buildup of electric charge. The anti-static properties of a material can be increased by making the material slightly conductive. One way to determine the conductive properties of a material is to measure the volume resistivity of the material. Volume resistivity indicates how readily a material conducts electricity. The lower the volume resistivity, the higher the electrical conductivity of the material and thus, the more readily the material conducts electricity. FIG. 4 shows illustrative volume resistivity data for several samples. As shown by the results, the samples which have activated carbon incorporated therein have reduced volume resistivity compared to the controls which do not have activated carbon incorporated therein. As explained above, the observed reduction in volume resistivity of the carbon-activated samples compared to the controls shows that the incorporation of activated carbon into the base materials improved the electrical conductivity and anti-static capability of the sample or membrane.

Figure 5:
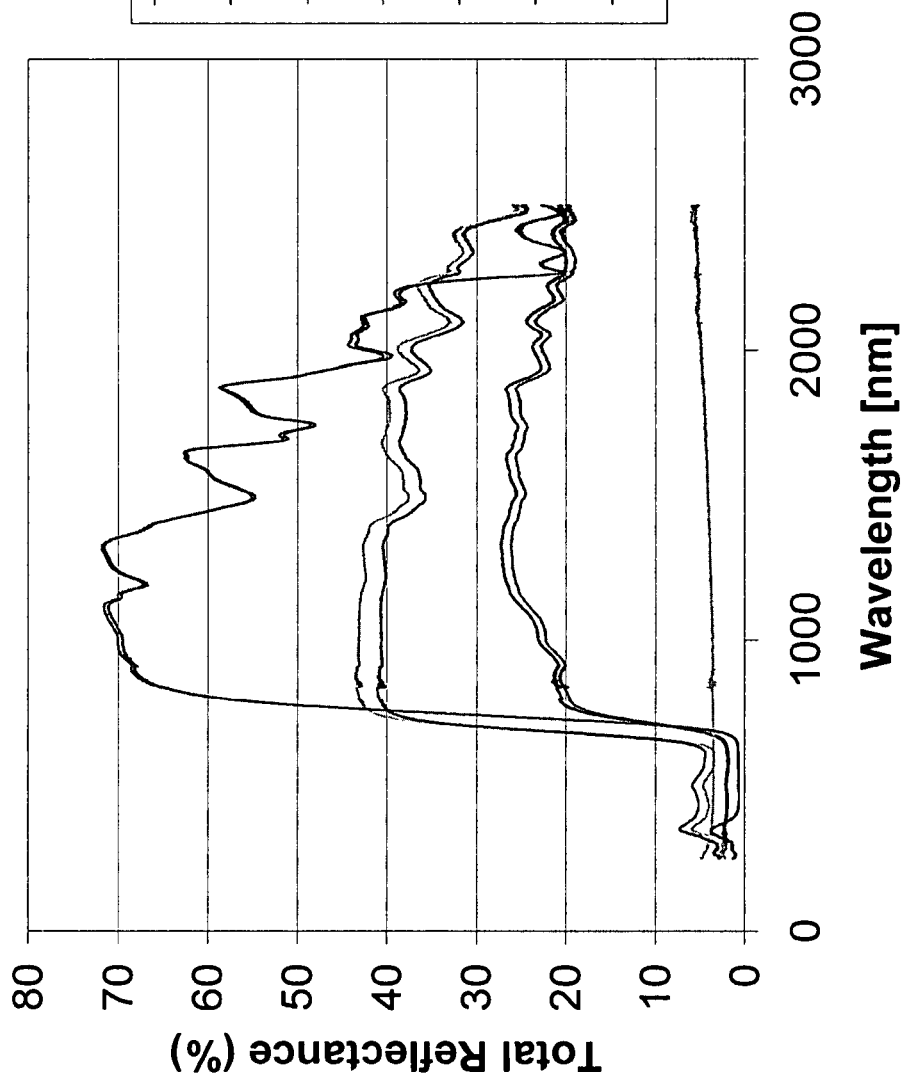
FIG. 5 shows illustrative data obtained from another experiment that was performed in accordance with the principles of some embodiments of the present invention.

In some embodiments, the methods described above for incorporating active particles into base materials (whether the active particles are protected prior to incorporation or not) may be used to also produce membranes with enhanced stealth properties. Material with enhanced stealth property possess low infra-red (IR) reflectance and may be useful as coatings for military garments, tanks, satellites, planes, and in any scenario where materials with enhanced stealth properties are desirable. Materials with low reflectance to a particular wavelength absorb most of that wavelength, and may therefore, make the material less detectable when subject to light of that particular wavelength. For example, in the present invention, it was found that incorporating active particles, such as for example activated carbon, into the base material increased the ability of the base materials to absorb IR light. FIG. 5 shows illustrative total reflectance of several different materials across varying wavelengths. Membrane sample 41-6-3, labeled 80_80_PVC_6_41_03 in FIG. 5, is shown to have a lower reflectance percentage than the other materials, across the same wavelengths.

Thus, active-particle enhanced membrane and methods for making the same are disclosed. The above described embodiments of the present invention are presented for purposes of illustration and not of limitation, and the present invention is limited only by the claims which follow.

I claim:

1. A water-proof breathable membrane comprising:
a substantially liquid-impermeable cured base material solution comprising a first thickness;
a plurality of active particles in contact with the substantially liquid-impermeable cured base material solution, wherein the plurality of active particles,
are capable of improving the transmission of vapor through the substantially liquid-impermeable cured base material solution, and
comprise a second thickness, wherein the first thickness is at least 2.5 times larger than the second thickness but less than an order of magnitude larger than the second thickness;
at least one removable encapsulant in an amount effective to prevent at least a substantial portion of the plurality of active particles from being deactivated prior to removal of the removable encapsulant; wherein,
the at least one removable encapsulant is removable to reactivate at least a portion of the plurality of active particles to improve the transmission of vapor through the water-proof breathable membrane, and
the membrane comprises a moisture vapor transmission rate from about 600 g/m²/day to about 11000 g/m²/day.

2. The membrane according to claim 1, wherein the membrane possesses anti-static properties due at least in part to the active particles.

3. The membrane according to claim 1, wherein the membrane possesses stealth properties due at least in part to the active particles.

4. The membrane according to claim 1, wherein the membrane possesses odor absorbance properties due at least in part to the active particles.

5. The membrane according to claim 1, wherein the membrane possesses quick drying properties due at least in part to the active particles.

6. The membrane according to claim 1, wherein the base material solution is selected from the group consisting of: a polyurethane solution, a polyacrylic solution, 1,3 propanediol terephthalate solutions, and any suitable combination thereof.

7. The membrane according to claim 1, wherein the active particles comprise activated carbon.

8. The membrane according to claim 1, wherein the active particles comprise zeolites.

9. The membrane according to claim 1, wherein the active particles are selected from the group consisting of: antibacterial, antiviral, antimicrobial, antifungal particles, and any suitable combination thereof.

10. The membrane according to claim 1, wherein the active particles are selected from the group consisting of: activated carbon, aluminum oxide (activated alumina), silica gel, soda ash, aluminum trihydrate, baking soda, p-methoxy-2-ethoxyethyl ester cinnamic acid (cinoxate), zinc oxide, zeolites, titanium dioxide, molecular filter-type materials, and any suitable combination thereof.

11. The membrane according to claim 1, wherein the at least one removable encapsulant is selected from the group consisting of: water-soluble surfactants, surfactants, salts, photo-reactive materials, degradable materials, bio-degradable materials, ethoxylated acetylenic diols, starches, lubricants, glycols, corn starch, mineral spirits, organic solvents, paraffinic solvents, and any suitable combination thereof.

12. The membrane according to claim 1, wherein the active particles comprise about 0% to about 75% of the total weight of the membrane.

13. The membrane according to claim 1, wherein the active particles comprise about 30% to about 50% of the total weight of the membrane.

14. The membrane according to claim 1, wherein the active particles comprise about 0% to about 30% of the total weight of the membrane.

15. The membrane according to claim 1, wherein the active particles comprise about 0% to about 50% of the total weight of the membrane.

16. The membrane according to claim 1, wherein the membrane comprises a yarn or fabric.

17. The membrane according to claim 1, wherein the membrane comprises a plastic material.

18. The membrane according to claim 1, wherein the membrane comprises an article of clothing.

19. The membrane according to claim 1, wherein the membrane comprises a fabric.

20. The membrane according to claim 1, wherein the membrane comprises a coated fabric.

21. The membrane according to claim 1, wherein the membrane is coated on to ePTFE.

22. The membrane according to claim 1, wherein the membrane comprises a coated article of clothing.

23. The membrane according to claim 1, wherein the membrane comprises a non-woven membrane.

24. The membrane according to claim 1, wherein the membrane comprises a laminate.

25. The membrane according to claim 1, wherein the membrane is selected from the group consisting of bags, foam, plastic components, upholstery, carpeting, rugs, mats, sheets, towels, rugs, pet beds, mattress pads, mattresses, curtains, filters, shoes, insoles, diapers, shirts, pants, blouses, undergarments, protective suits, and any suitable combination thereof.

26. The membrane according to claim 1, wherein the removable encapsulant is a first removable encapsulant, and the membrane further comprises a second removable encapsulant.

27. A water-proof composition comprising:
a liquid-impermeable breathable cured base material comprising a first thickness;
a plurality of active particles in contact with the liquid-impermeable breathable cured base material, the plurality of active particles comprising a second thickness; and
wherein,
the first thickness comprises a thickness at least 2.5 times larger than the second thickness but less than an order of magnitude larger than the second thickness,
the active particles improve the moisture vapor transport capacity of the composition, and
a moisture vapor transmission rate of the water-proof composition comprises from about 600 $g/m^2/day$ to about 11000 $g/m^2/day$.

28. The composition of claim 27, wherein the active particles comprise about 0% to about 75% of the total weight of the composition.

29. The composition of claim 27, wherein the active particles comprise about 30% to about 50% of the total weight of the composition.

30. The composition of claim 27, wherein the active particles comprise about 0% to about 30% of the total weight of the composition.

31. The composition of claim 27, wherein the active particles comprise about 25% to about 75% of the total weight of the composition.

32. The composition of claim 27, wherein the active particles comprise about 0% to about 50% of the total weight of the composition.

33. The composition of claim 27, wherein the composition possesses anti-static properties at least in part due to the active particles.

34. The composition of claim 27, wherein the composition possesses stealth properties at least in part due to the active particles.

35. The composition of claim 27, wherein the composition possesses odor absorbance properties at least in part due to the active particles.

36. The composition of claim 27, wherein the composition possesses quick drying properties at least in part due to the active particles.

37. The composition of claim 27, wherein the active particles are selected from the group consisting of: activated carbon, aluminum oxide (activated alumina), silica gel, soda ash, aluminum trihydrate, baking soda, p-methoxy-2-ethoxyethyl ester cinnamic acid (cinoxate), zinc oxide, zeolites, titanium dioxide, molecular filter-type materials, and any suitable combination thereof.

38. The composition of claim 27 further comprising: at least one removable encapsulant in an amount effective to prevent at least a substantial portion of the active particles from being deactivated prior to removal of the removable encapsulant, and wherein the removable encapsulant is removable to reactivate at least a portion of the active particles to improve the moisture vapor transport capacity of the composition.

39. The composition of claim 38, wherein the at least one removable encapsulant is selected from the group consisting of: water-soluble surfactants, surfactants, salts, polymer salts, polyvinyl alcohols, waxes, photo-reactive materials, degradable materials, bio-degradable materials, ethoxylated acetylenic diols, starches, lubricants, glycols, corn starch, mineral spirits, organic solvents, paraffinic solvents, and any suitable combination thereof.

40. A water-proof composition comprising:
a base material comprising a first thickness;
a plurality of active particles in contact with the base material, the plurality of active particles comprising a second thickness; and wherein,
the first thickness is at least 2.5 times larger than the second thickness but less than an order of magnitude larger than the second thickness,
the active particles improve the vapor transport and anti-static properties of the composition, and
a moisture vapor transmission rate of the water-proof composition comprises from about 600 g/m$^2$/day to about 11000 g/m$^2$/day.

41. The composition of claim 40, wherein the active particles comprise activated carbon.

42. The composition of claim 40, wherein the active particles comprise zeolites.

43. The composition of claim 40, wherein the active particles comprise about 30% to about 50% of the total weight of the composition.

44. The composition of claim 40, wherein the active particles comprise about 0% to about 30% of the total weight of the composition.

45. A water-proof composition comprising:
a base material comprising a first thickness;
a plurality of active particles in contact with the base material, the plurality of active particles comprising a second thickness; and wherein,
the first thickness comprises a thickness about 2.5 times larger than the second thickness but less than an order of magnitude larger than the second thickness,
the active particles improve the vapor transport and stealth properties of the composition, and
a moisture vapor transmission rate of the water-proof composition comprises from about 600 g/m$^2$/day to about 11000 g/m$^2$/day.

46. The composition of claim 45, wherein the active particles comprise activated carbon.

47. The composition of claim 45, wherein the active particles comprise zeolites.

48. The composition of claim 45, wherein the active particles comprise about 30% to about 50% of the total weight of the composition.

49. The composition of claim 45, wherein the active particles comprise about 0% to about 30% of the total weight of the composition.

50. The membrane of claim 1, wherein, the substantially liquid-impermeable cured base material solution, plurality of active particles, and at least one removable encapsulant comprise a mixture, the mixture being adapted for application to a substrate prior to the substantially liquid-impermeable cured base material solution being cured.

51. The membrane of claim 1 wherein,
the first thickness comprises a thickness of about 1 mil.

52. The composition of claim 27 wherein,
the first thickness comprises a thickness of about 1 mil.

53. The composition of claim 40 wherein,
the first thickness comprises a thickness of about 1 mil.

54. The composition of claim 45 wherein,
the first thickness comprises a thickness of about 1 mil.

55. The membrane of claim 1 wherein, the first thickness is at least as large as the second thickness.

56. The composition of claim 27 wherein, the first thickness is at least as large as the second thickness.

57. The composition of claim 40 wherein, the first thickness is at least as large as the second thickness.

58. The composition of claim 45 wherein, the first thickness is at least as large as the second thickness.

59. The composition of claim 1 wherein, the second thickness comprises a thickness of about 10 microns.

60. The composition of claim 27 wherein, the second thickness comprises a thickness of about 10 microns.

61. The composition of claim 40 wherein, the second thickness comprises a thickness of about 10 microns.

62. The composition of claim 45 wherein, the second thickness comprises a thickness of about 10 microns.

* * * * *